(12) United States Patent
Zhang et al.

(10) Patent No.: US 12,508,258 B2
(45) Date of Patent: Dec. 30, 2025

(54) QUINOLINE DERIVATIVE FOR TREATING RHEUMATOID ARTHRITIS

(71) Applicant: CHIA TAI TIANQING PHARMACEUTICAL GROUP CO., LTD., Jiangsu (CN)

(72) Inventors: Xiquan Zhang, Lianyungang (CN); Ling Yang, Lianyungang (CN); Hongjiang Xu, Lianyungang (CN); Wei Song, Lianyungang (CN); Xiaofang Zou, Lianyungang (CN); Xianju Wang, Lianyungang (CN)

(73) Assignee: CHIA TAI TIANQING PHARMACEUTICAL GROUP CO., LTD., Lianyungang (CN)

( * ) Notice: Subject to any disclaimer, the term of this patent is extended or adjusted under 35 U.S.C. 154(b) by 749 days.

(21) Appl. No.: 17/792,932

(22) PCT Filed: Jan. 19, 2021

(86) PCT No.: PCT/CN2021/072711
§ 371 (c)(1),
(2) Date: Jul. 14, 2022

(87) PCT Pub. No.: WO2021/143928
PCT Pub. Date: Jul. 22, 2021

(65) Prior Publication Data
US 2023/0079843 A1   Mar. 16, 2023

(30) Foreign Application Priority Data
Jan. 19, 2020 (CN) .......................... 202010061942.6

(51) Int. Cl.
*A61K 31/4709* (2006.01)
*A61K 31/42* (2006.01)
*A61K 31/4706* (2006.01)
*A61K 31/519* (2006.01)
*A61K 31/655* (2006.01)
*A61P 19/02* (2006.01)

(52) U.S. Cl.
CPC .......... *A61K 31/4709* (2013.01); *A61K 31/42* (2013.01); *A61K 31/4706* (2013.01); *A61K 31/519* (2013.01); *A61K 31/655* (2013.01); *A61P 19/02* (2018.01)

(58) Field of Classification Search
CPC ........................... A61K 31/4709; A61P 19/02
See application file for complete search history.

(56) References Cited

U.S. PATENT DOCUMENTS

| | | | |
|---|---|---|---|
| 9,968,597 B2 * | 5/2018 | Zhang | A61K 31/4709 |
| 10,183,017 B2 * | 1/2019 | Zhang | A61K 9/48 |
| 10,251,876 B2 * | 4/2019 | Wang | A61P 35/00 |
| 10,307,412 B2 * | 6/2019 | Wang | A61K 31/4035 |
| 10,561,647 B2 * | 2/2020 | Wang | A61P 35/00 |
| 10,736,887 B2 * | 8/2020 | Chen | A61K 9/20 |
| 10,888,559 B2 * | 1/2021 | Wang | A61P 35/04 |
| 11,419,862 B2 * | 8/2022 | Wang | A61K 9/0053 |
| 11,554,115 B2 * | 1/2023 | Tian | A61K 31/7068 |
| 11,731,955 B2 * | 8/2023 | Dong | A61P 35/00 546/153 |
| 2017/0182027 A1 * | 6/2017 | Wang | A61K 9/48 |

FOREIGN PATENT DOCUMENTS

| | | |
|---|---|---|
| CN | 1446212 A | 10/2003 |
| CN | 101809012 A | 8/2010 |
| CN | 103288921 A | 9/2013 |
| CN | 107771078 A | 3/2018 |
| CN | 108601766 A | 9/2018 |
| WO | 2008112407 A1 | 9/2008 |
| WO | 2016/091165 A1 | 6/2016 |
| WO | 2018/214925 A1 | 11/2018 |

OTHER PUBLICATIONS

Apr. 21, 2021 Search Report issued in International Patent Application No. PCT/CN2021/072711.
Xie et al.; "Preclinical characterization of anlotinib, a highly potent and selective vascular endothelial growth factor receptor-2 inhibitor"; Cancer Science; 2018; wileyonlinelibrary.com/journal/cas; pp. 1207-1219.

* cited by examiner

*Primary Examiner* — James D. Anderson
(74) *Attorney, Agent, or Firm* — Oliff PLC

(57) ABSTRACT

A quinoline derivative for treating rheumatoid arthritis and a use thereof in preparing a pharmaceutical composition for treating rheumatoid arthritis. In particular, a use of the quinoline derivative 1-[[[4-(4-Fluoro-2-methyl-1H-indol-5-yl)oxy-6-methoxyquinoline-7-yl]oxy]methyl]cyclopropan-amine in treating rheumatoid arthritis.

13 Claims, 4 Drawing Sheets

QUINOLINE DERIVATIVE FOR TREATING RHEUMATOID ARTHRITIS

TECHNICAL FIELD

The present invention relates to the technical field of pharmaceutics, and particularly relates to use of a quinoline derivative for preparing a medicament or a pharmaceutical combination for treating rheumatoid arthritis.

BACKGROUND

Rheumatoid arthritis (RA) is an autoimmune disease with erosive arthritis as the main clinical manifestation, and can occur at any age. The pathogenesis of RA is not clear at present, and the basic pathological manifestations are synovitis, pannus formation and the gradual destruction of articular cartilage and bone, eventually leading joint to deformity and loss of function, and RA can be complicated by lung diseases, cardiovascular diseases, malignant tumors, depression and the like. Epidemiological survey shows that the global morbidity of RA is 0.5%-1%, the morbidity of the Chinese mainland area is 0.42%, the total sick population is about 5 million, and the morbidity ratio of male to female is about 1:4. The disability rates of RA patients in China in the course of disease are respectively 18.6%, 43.5%, 48.1% and 61.3% in the period of disease 1-5 years, 5-10 years, 10-15 years and more than 15 years, and the incidence rates of disability and limited functions are increased along with the prolongation of the course of disease. RA not only causes the decline of the physical function, the quality of life and the social participation of the patients, but also brings huge economic burden to the families of patients and the society.

According to recommendation of 2018 Chinese guideline for the diagnosis and treatment of rheumatoid arthritis, once RA patients are diagnosed, the traditional synthetic disease modifying antirheumatic drugs (DMARDs) treatment should be started as soon as possible, and methotrexate is recommended to be preferred used alone; when methotrexate contraindications exist, leflunomide or sulfasalazine alone is contemplated. For RA patients with moderate/high disease activity, traditional synthetic DMARDs in combination with small doses of short-course glucocorticoids and/or non-steroidal anti-inflammatory drugs (NSAIDs) are recommend for rapid control of symptoms. Adverse effects should be closely monitored during treatment. The use of glucocorticoids alone or in large doses over a long period of time is not recommended.

In the disease modifying antirheumatic drugs, the price of the targeted synthetic DMARDs and the biological DMARDs is high, and the treatment cost of a patient is high, while the traditional synthetic DMARDs commonly include methotrexate, leflunomide, hydroxychloroquine and sulfasalazine. These medicaments can slow the progression of rheumatoid arthritis and protect joints and other tissues from permanent damage. But their side effects vary and may even include more serious side effects such as liver damage, bone marrow suppression and serious lung infections.

Glucocorticoids and non-steroidal anti-inflammatory drugs have certain side effects themselves, wherein glucocorticoids can even lead to relapse and aggravate disease development after long-term use, and both glucocorticoids and non-steroidal anti-inflammatory drugs can only alleviate the symptoms of RA, but cannot prevent the progression of diseases.

SUMMARY

In one aspect, the present invention provides a method for treating rheumatoid arthritis, which comprises administering to a patient in need of treatment a therapeutically effective amount of a compound of formula I or a pharmaceutically acceptable salt thereof.

In some embodiments, the present invention provides a method for improving physical function and/or quality of life of a patient with rheumatoid arthritis, which comprises administering to the patient in need of treatment a therapeutically effective amount of the compound of formula I or the pharmaceutically acceptable salt thereof. The improvement in the physical function can be measured using standard methods (e.g., HAQ-DI parameters) in the art commonly used by clinicians and rheumatologists; the improvement in the quality of life can be measured using standard methods (e.g., SF36 parameters) in the art.

In some embodiments, the patient has previously received the treatment with a disease modifying antirheumatic drug. In some embodiments, the rheumatoid arthritis is the rheumatoid arthritis that is insufficiently responsive or intolerant to at least one disease modifying antirheumatic drug. In some embodiments, the patient is insufficiently responsive or intolerant to at least one disease modifying antirheumatic drug. In some embodiments, the patient did not meet the target or did not reduce disease activity after having previously received treatment with a traditional disease modifying antirheumatic drug, a targeted disease modifying antirheumatic drug, and/or a biological disease modifying antirheumatic drug. In some embodiments, the rheumatoid arthritis is the rheumatoid arthritis that is insufficiently responsive or intolerant to methotrexate. In some embodiments, the patient is insufficiently responsive or intolerant to methotrexate.

In some embodiments, the rheumatoid arthritis is active rheumatoid arthritis. In some embodiments, the rheumatoid arthritis is moderate-to-severe, -moderate and/or -severe active rheumatoid arthritis.

In some embodiments, the rheumatoid arthritis is moderate-to-severe rheumatoid arthritis, and the patient is insufficiently responsive or intolerant to one or more previously-received disease modifying antirheumatic drugs.

In some embodiments, the compound of formula I or the pharmaceutically acceptable salt thereof is administered alone as the only active ingredient to a patient with rheumatoid arthritis.

In some embodiments, the compound of formula I or the pharmaceutically acceptable salt thereof is administered simultaneously or sequentially with other disease modifying antirheumatic drugs to the patient with rheumatoid arthritis. In some embodiments, the other disease modifying antirheumatic drugs include, but are not limited to, the traditional disease modifying antirheumatic drugs, the targeted disease modifying antirheumatic drugs, or the biological disease modifying antirheumatic drugs. In some embodiments, the other disease modifying antirheumatic drugs are one or more selected from the group consisting of the traditional disease modifying antirheumatic drugs, the targeted disease modifying antirheumatic drugs, and the biological disease modifying antirheumatic drugs. In some embodiments, the compound of formula I or the pharmaceutically acceptable salt thereof is administered simultaneously or sequentially with a non-biological disease modifying antirheumatic drug to the patient with rheumatoid arthritis. In some embodiments, the compound of formula I or the pharmaceutically acceptable salt thereof is administered simultaneously or sequentially with one or more of methotrexate, sulfasalazine, leflunomide, hydroxychloroquine and tofacitinib to the patient with rheumatoid arthritis. In some embodiments, the compound of formula I or the pharmaceutically acceptable salt thereof is administered simultaneously or sequentially with methotrexate+sulfasalazine, methotrexate+leflunomide, methotrexate+hydroxychloroquine, sulfasalazine+leflunomide, methotrexate+sulfasalazine+hydroxychloroquine, (sulfasalazine and/or leflunomide)+hydroxychloroquine, or tofacitinib+(methotrexate, sulfasalazine, leflunomide and/or hydroxychloroquine) to the patient with rheumatoid arthritis. In some embodiments, during the period when the compound of formula I or the pharmaceutically acceptable salt thereof is administered simultaneously or sequentially with a disease modifying antirheumatic drug to the patient with rheumatoid arthritis, a glucocorticoid drug (e.g., prednisone, prednisolone or dexamethasone) is further administered.

In another aspect, the present application provides use of the compound of formula I or the pharmaceutically acceptable salt thereof in treating rheumatoid arthritis in the patient.

In some embodiments, provided is use of the compound of formula I or the pharmaceutically acceptable salt thereof in improving the physical function and/or the quality of life of the patient with rheumatoid arthritis.

In some embodiments, the patient has previously received the treatment with a disease modifying antirheumatic drug. In some embodiments, the rheumatoid arthritis is the rheumatoid arthritis that is insufficiently responsive or intolerant to at least one disease modifying antirheumatic drug. In some embodiments, the patient is insufficiently responsive or intolerant to at least one disease modifying antirheumatic drug. In some embodiments, the patient did not meet the target or did not reduce the disease activity after having previously received treatment with the traditional disease modifying antirheumatic drug, the targeted disease modifying antirheumatic drug, and/or the biological disease modifying antirheumatic drug. In some embodiments, the rheumatoid arthritis is the rheumatoid arthritis that is insufficiently responsive or intolerant to methotrexate. In some embodiments, the patient is insufficiently responsive or intolerant to methotrexate.

In some embodiments, the rheumatoid arthritis is active rheumatoid arthritis. In some embodiments, the rheumatoid arthritis is moderate-to-severe, moderate and/or severe active rheumatoid arthritis.

In some embodiments, the rheumatoid arthritis is moderate-to-severe rheumatoid arthritis, and the patient is insufficiently responsive or intolerant to one or more previously-received disease modifying antirheumatic drugs.

In some embodiments, the other disease modifying antirheumatic drugs are further comprised, which can be administered simultaneously or sequentially to the patient with rheumatoid arthritis. In some embodiments, the other disease modifying antirheumatic drugs include, but are not limited to, the traditional disease modifying antirheumatic drugs, the targeted disease modifying antirheumatic drugs, or the biological disease modifying antirheumatic drugs. In some embodiments, the other disease modifying antirheumatic drugs are one or more selected from the group consisting of the traditional disease modifying antirheumatic drugs, the targeted disease modifying antirheumatic drugs, and the biological disease modifying antirheumatic drugs. In some embodiments, the other disease modifying antirheumatic drugs are the non-biological disease modifying antirheumatic drugs, which can be administered simultaneously or sequentially to the patient with rheumatoid arthritis. In some embodiments, the other disease modifying antirheumatic drugs are one or more selected from the group consisting of methotrexate, sulfasalazine, leflunomide, hydroxychloroquine and tofacitinib. In some embodiments, the other disease modifying antirheumatic drugs are selected from the group consisting of: methotrexate+sulfasalazine, methotrexate+leflunomide, methotrexate+hydroxychloroquine, sulfasalazine+leflunomide, methotrexate+sulfasalazine+hydroxychloroquine, (sulfasalazine and/or leflunomide)+hydroxychloroquine, or tofacitinib+(methotrexate, sulfasalazine, leflunomide and/or hydroxychloroquine). In some embodiments, the glucocorticoid drug (e.g., prednisone, prednisolone or dexamethasone) is further comprised.

In yet another aspect, the present application provides use of the compound of formula I or the pharmaceutically acceptable salt thereof for preparing a medicament or a pharmaceutical composition for treating rheumatoid arthritis.

In some embodiments, the present application provides use of the compound of formula I or the pharmaceutically acceptable salt thereof for preparing a medicament or a pharmaceutical composition for improving the physical function and/or the quality of life of the patient with rheumatoid arthritis.

In some embodiments, the rheumatoid arthritis is the rheumatoid arthritis that has previously received treatment with the disease modifying antirheumatic drug. In some embodiments, the rheumatoid arthritis is the rheumatoid arthritis that is insufficiently responsive or intolerant to at least one disease modifying antirheumatic drug. In some embodiments, the rheumatoid arthritis is the rheumatoid arthritis that did not meet the target or did not reduce the disease activity after having previously received treatment with the traditional disease modifying antirheumatic drug, the targeted disease modifying antirheumatic drug, and/or the biological disease modifying antirheumatic drug. In some embodiments, the rheumatoid arthritis is the rheumatoid arthritis that is insufficiently responsive or intolerant to methotrexate.

In some embodiments, the rheumatoid arthritis is active rheumatoid arthritis. In some embodiments, the rheumatoid arthritis is moderate-to-severe, moderate and/or severe active rheumatoid arthritis.

In some embodiments, the rheumatoid arthritis is moderate-to-severe rheumatoid arthritis, and is insufficiently responsive or intolerant to one or more disease modifying antirheumatic drugs.

In some embodiments, in the medicament or the pharmaceutical composition, the compound of formula I or the pharmaceutically acceptable salt thereof is the only active ingredient.

In some embodiments, the medicament or the pharmaceutical composition further comprises other disease modifying antirheumatic drugs; wherein the compound of formula I or the pharmaceutically acceptable salt thereof is administered simultaneously or sequentially with the other disease modifying antirheumatic drugs to the patient with rheumatoid arthritis. In some embodiments, the other disease modifying antirheumatic drugs include, but are not limited to, the traditional disease modifying antirheumatic drugs, the targeted disease modifying antirheumatic drugs, or the biological disease modifying antirheumatic drugs. In some embodiments, the other disease modifying antirheumatic drugs are one or more selected from the group consisting of the traditional disease modifying antirheumatic drugs, the targeted disease modifying antirheumatic drugs and the biological disease modifying antirheumatic drugs. In some embodiments, the other disease modifying antirheumatic drugs are selected from the group consisting of the non-biological disease modifying antirheumatic drugs. In some embodiments, the compound of formula I or the pharmaceutically acceptable salt thereof can be administered simultaneously or sequentially with the non-biological disease modifying antirheumatic drug to the patient with rheumatoid arthritis. In some embodiments, the disease modifying antirheumatic drug is one or more selected from the group consisting of methotrexate, sulfasalazine, leflunomide, hydroxychloroquine and tofacitinib. In some embodiments, the other disease modifying antirheumatic drugs are selected from the group consisting of: methotrexate+sulfasalazine, methotrexate+leflunomide, methotrexate+hydroxychloroquine, sulfasalazine+leflunomide, methotrexate+sulfasalazine+hydroxychloroquine, (sulfasalazine and/or leflunomide)+hydroxychloroquine, or tofacitinib+(methotrexate, sulfasalazine, leflunomide and/or hydroxychloroquine). In some embodiments, the medicament or the pharmaceutical composition further comprises the glucocorticoid drug (e.g., prednisone, prednisolone or dexamethasone).

In yet another aspect, the present application provides a pharmaceutical composition for treating rheumatoid arthritis, which comprises the compound of formula I or the pharmaceutically acceptable salt thereof and at least one pharmaceutically acceptable carrier.

In some embodiments, the present application provides a pharmaceutical composition for improving the physical function and/or the quality of life of the patient with rheumatoid arthritis.

In some embodiments, the rheumatoid arthritis is the rheumatoid arthritis that has previously received treatment with the disease modifying antirheumatic drug. In some embodiments, the rheumatoid arthritis is the rheumatoid arthritis that is insufficiently responsive or intolerant to at least one disease modifying antirheumatic drug. In some embodiments, the rheumatoid arthritis did not meet the target or did not reduce the disease activity after having previously received treatment with the traditional disease modifying antirheumatic drug, the targeted disease modifying antirheumatic drug, and/or the biological disease modifying antirheumatic drug. In some embodiments, the rheumatoid arthritis is the rheumatoid arthritis that is insufficiently responsive or intolerant to methotrexate.

In some embodiments, the rheumatoid arthritis is active rheumatoid arthritis. In some embodiments, the rheumatoid arthritis is moderate-to-severe, moderate and/or severe active rheumatoid arthritis.

In some embodiments, the rheumatoid arthritis is moderate-to-severe rheumatoid arthritis, and is insufficiently responsive or intolerant to one or more disease modifying antirheumatic drugs.

In some embodiments, in the pharmaceutical composition, the compound of formula I or the pharmaceutically acceptable salt thereof is the only active ingredient.

In some embodiments, the pharmaceutical composition further comprises the other disease modifying antirheumatic drugs. In some embodiments, the other disease modifying antirheumatic drugs are one or more selected from the group consisting of the traditional disease modifying antirheumatic drugs, the targeted disease modifying antirheumatic drugs and the biological disease modifying antirheumatic drugs. In some embodiments, the other disease modifying antirheumatic drugs are selected from the group consisting of the non-biological disease modifying antirheumatic drugs. In some embodiments, the compound of formula I or the pharmaceutically acceptable salt thereof can be administered simultaneously or sequentially with the non-biological disease modifying antirheumatic drug to the patient with rheumatoid arthritis. In some embodiments, the disease modifying antirheumatic drug is one or more selected from the group consisting of methotrexate, sulfasalazine, leflunomide, hydroxychloroquine and tofacitinib. In some embodiments, the other disease modifying antirheumatic drugs are selected from the group consisting of: methotrexate+sulfasalazine, methotrexate+leflunomide, methotrexate+hydroxychloroquine, sulfasalazine+leflunomide, methotrexate+sulfasalazine+hydroxychloroquine, (sulfasalazine and/or leflunomide)+hydroxychloroquine, or tofacitinib+(methotrexate, sulfasalazine, leflunomide and/or hydroxychloroquine). In some embodiments, the pharmaceutical composition further comprises the glucocorticoid drug (e.g., prednisone, prednisolone or dexamethasone).

In yet another aspect, the present invention provides a kit comprising (a) at least one unit dose of the pharmaceutical composition of the compound of formula I or the pharmaceutically acceptable salt thereof and (b) instructions for use in treating rheumatoid arthritis.

Compound of Formula I or Pharmaceutically Acceptable Salt Thereof

In the present application, the chemical name of the compound of formula I is 1-[[[4-(4-fluoro-2-methyl-1H-indol-5-yl)oxy-6-methoxyquinolin-7-yl]oxy]methyl]cyclopropylamine, which has the following structural formula:

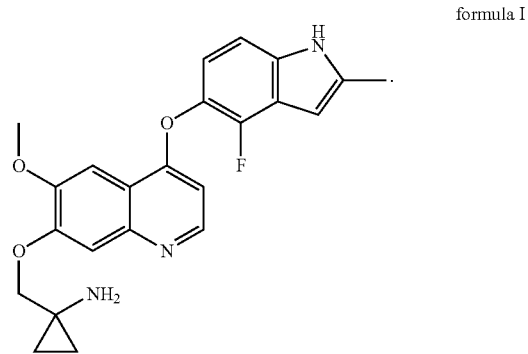 [SMILES: COc1cc2c(Oc3ccc4[nH]c(C)cc4c3F)ccnc2cc1OCC1(N)CC1]

formula I

The compound of formula I can be administered in its free base form, or in the form of its salt, hydrate or prodrug that may convert in vivo into the free base form of the compound of formula I. For example, within the scope of the present invention, the pharmaceutically acceptable salt of the compound of formula I can be generated from various organic and inorganic acids according to methods well known in the art.

In some specific embodiments of the present invention, the pharmaceutically acceptable salt of the compound of formula I is a hydrochloride salt. In some specific embodiments, the pharmaceutically acceptable salt is a monohydrochloride salt of the compound of formula I or a dihydrochloride salt of the compound of formula I. In some specific embodiments, the hydrochloride salt of the compound of formula I exists in the form of crystal. In some specific embodiments, the dihydrochloride salt of the compound of formula I exists in the form of crystal.

The compound of formula I or the pharmaceutically acceptable salt thereof can be administered via multiple routes of administration including, but not limited to, oral, parenteral, intraperitoneal, intravenous, intra-arterial, transdermal, sublingual, intramuscular, rectal, transbuccal, intranasal, inhalational, vaginal, intraocular, topical, subcutaneous, intralipid, intra-articular and intrathecal administrations. In some specific embodiments, by oral administration, specific dosage forms include, but are not limited to, tablets, capsules, powders, granules, dripping pills, pastes, pulvis, and the like, and preferably tablets or capsules. The tablet may be a common tablet, dispersible tablet, effervescent tablet, sustained-release tablet, controlled-release tablet or enteric coated tablet. The capsule may be a common capsule, sustained-release capsule, controlled-release capsule or enteric coated capsule. The oral formulation can be prepared by a conventional method using a pharmaceutically acceptable carrier well known in the art. The pharmaceutically acceptable carriers include, but are not limited to, fillers, absorbents, wetting agents, binders, disintegrants, lubricants, and the like. The fillers include starch, lactose, mannitol, microcrystalline cellulose, and the like. The absorbents include, but are not limited to, calcium sulfate, calcium hydrophosphate, calcium carbonate, and the like. The wetting agents include water, ethanol, and the like. The binders include, but are not limited to, hydroxypropyl methylcellulose, polyvidone, microcrystalline cellulose, and the like. The disintegrants include, but are not limited to, croscarmellose sodium, crospovidone, surfactants, low-substituted hydroxypropylcellulose, and the like. The lubricants include, but are not limited to, magnesium stearate, talcum powder, polyethylene glycol, sodium dodecyl sulfate, micronized silica gel, talcum powder, and the like. The pharmaceutically acceptable excipients further include coloring agents, sweeteners and the like.

In some embodiments of the use and treatment methods of the present application, the compound of formula I or the pharmaceutically acceptable salt thereof is administered in a daily dose of 2 mg to 20 mg; in some specific embodiments, the daily dose is 5 mg to 20 mg; in some specific embodiments, the daily dose is 10 mg to 16 mg; in some embodiments, the daily dose is 10 mg to 14 mg; in some specific embodiments, the daily dose is 6 mg, 8 mg, 10 mg, 12 mg, 14 mg or 16 mg.

In the above treatment methods or use, the compound of formula I or the pharmaceutically acceptable salt thereof can be administered once or more times daily in single or multiple doses. In some specific embodiments of the present invention, the compound of formula I or the pharmaceutically acceptable salt thereof is administered once daily.

The amount of the compound of formula I or the pharmaceutically acceptable salt thereof administered can be determined according to the severity of the disease, the response of the disease, any treatment-related toxicity and the age and health of a patient. Preferably, the compound of formula I or the pharmaceutically acceptable salt thereof is administered at intervals, the intermittent administration comprising an administration period and an interruption period. During the administration period, the compound of formula I or a pharmaceutically acceptable salt thereof may be administered once or multiple times daily. For example, the compound of formula I or the pharmaceutically acceptable salt thereof is administered daily during the administration period. The administration is then stopped for a period of time during an interruption period, followed by an administration period, and then followed by an interruption period, which may be repeated multiple times. The ratio of the administration period to the interruption period in days is 2:(0.5-5), preferably 2:(0.5-3), more preferably 2:(0.5-2), and even more preferably 2:(0.5-1).

In some specific embodiments, the compound of formula I or the pharmaceutically acceptable salt thereof is administered in a regimen of consecutively two-week administration (14 days) and then two-week (14 days) interruption. In some specific embodiments, the administration is performed in a regimen of once daily with consecutively two-week administration and then two-week interruption.

In some specific embodiments, the compound of formula I or the pharmaceutically acceptable salt thereof is administered in a regimen of consecutively two-week administration (14 days) and then one-week (7 days) interruption. In some specific embodiments, the administration is performed once daily with consecutively two-week administration and then one-week interruption.

In some specific embodiments, the compound of formula I or the pharmaceutically acceptable salt thereof is administered in a regimen of consecutively five-day administration and then two-day interruption. In some specific embodiments, the administration is performed once daily with consecutively five-day administration and then two-day interruption.

Rheumatoid Arthritis (RA)

In the compound of formula I of the present application, the rheumatoid arthritis can be classified as systemic, polyarthric or oligoarticular rheumatoid arthritis according to the difference of joint damage at the onset; according to the age of the patient, the rheumatoid arthritis can be classified as juvenile rheumatoid arthritis or adult rheumatoid arthritis; according to the degree of disease activity (degree of disease remission), the rheumatoid arthritis can be classified as slight, moderate and severe active rheumatoid arthritis. There is also special rheumatoid arthritis including, but not limited to, adult-onset Still's disease, Felty's syndrome, large granular lymphocyte syndrome, palindromic rheumatism, remitting seronegative symmetrical synovitis with pitting edema syndrome, or robust arthritis.

In some specific embodiments of the present invention, provided is use of the compound of formula I or the pharmaceutically acceptable salt thereof for preparing a medicament or a pharmaceutical composition for treating systemic rheumatoid arthritis, which comprises administering to a patient in need of treatment a therapeutically effective amount of the compound of formula I or the pharmaceutically acceptable salt thereof.

In some specific embodiments of the present invention, provided is use of the compound of formula I or the pharmaceutically acceptable salt thereof for preparing a medicament or a pharmaceutical composition for treating polyarticular rheumatoid arthritis, which comprises administering to a patient in need of treatment a therapeutically effective amount of the compound of formula I or the pharmaceutically acceptable salt thereof.

In some specific embodiments of the present invention, provided is use of the compound of formula I or the pharmaceutically acceptable salt thereof for preparing a medicament or a pharmaceutical composition for treating oligoarticular rheumatoid arthritis, which comprises administering to a patient in need of treatment a therapeutically effective amount of the compound of formula I or the pharmaceutically acceptable salt thereof.

In some specific embodiments of the present invention, provided is use of the compound of formula I or the pharmaceutically acceptable salt thereof for preparing a medicament or a pharmaceutical composition for treating juvenile rheumatoid arthritis, which comprises administering to a patient in need of treatment a therapeutically effective amount of the compound of formula I or the pharmaceutically acceptable salt thereof.

In some specific embodiments of the present invention, provided is use of the compound of formula I or the pharmaceutically acceptable salt thereof for preparing a medicament or a pharmaceutical composition for treating adult rheumatoid arthritis, which comprises administering to a patient in need of treatment a therapeutically effective amount of the compound of formula I or the pharmaceutically acceptable salt thereof.

The present invention further provides use of the compound of formula I or the pharmaceutically acceptable salt thereof for preparing a medicament or a pharmaceutical composition for treating special rheumatoid arthritis. The special rheumatoid arthritis includes, but is not limited to, adult-onset Still's disease, Felty's syndrome, large granular lymphocyte syndrome, palindromic rheumatism, remitting seronegative symmetrical synovitis with pitting edema syndrome, or robust arthritis.

In some embodiments, the patient also has a tumor; the tumor includes a malignant tumor, wherein examples that may be listed include, but are not limited to, lung cancer, thyroid cancer, sarcoma, colorectal cancer, gastric cancer, liver cancer, breast cancer, kidney cancer, esophageal cancer, brain tumor, ovarian cancer, endometrial cancer, cervical cancer, prostate cancer, bladder cancer, pancreatic cancer, fallopian tube cancer, peritoneal cancer, nasopharyngeal cancer, head and neck cancer, melanoma and hematological tumor.

In some specific embodiments of the present application, the patient has previously received treatment with a disease modifying antirheumatic drug. In some preferred embodiments of the present application, the patient did not meet the target or did not reduce the disease activity after having previously received treatment with the traditional disease modifying antirheumatic drug, the targeted disease modifying antirheumatic drug, and/or the biological disease modifying antirheumatic drug.

In some specific embodiments of the present application, the rheumatoid arthritis is the rheumatoid arthritis that is not sufficiently efficacious or intolerant to at least one disease modifying antirheumatic drug.

In the present application, the disease modifying antirheumatic drugs include, but are not limited to, the traditional disease modifying antirheumatic drugs (examples that may be listed include, but are not limited to, methotrexate, sulfasalazine, leflunomide, chloroquine, hydroxychloroquine, auranofin, azathioprine, penicillamine, cyclosporine A and cyclophosphamide), the targeted modifying disease modifying antirheumatic drugs (including, but not limited to, JAK inhibitors such as tofacitinib, baricitinib, filgotinib, ABT-494, peficitinib and dacomitinib), and the biological disease modifying antirheumatic drugs. The biological disease modifying antirheumatic drugs include, but are not limited to, tumor necrosis factor (TNF) α inhibitors, interleukin (IL)-1 and IL-6 antagonists, anti-CD20 monoclonal antibodies, T cell costimulatory signal inhibitors and the like; wherein the tumor necrosis factor (TNF) α inhibitors include, but are not limited to, etanercept, infliximab, adalimumab, golimumab, certolizumab and the like; IL-6 antagonists include, but are not limited to, tocilizumab (Actemra®) and the like; IL-1 antagonists include, but are not limited to, anakinra and the like; anti-CD20 monoclonal antibodies include, but are not limited to, rituximab; T cell costimulatory signal inhibitors include, but are not limited to, abatacept and the like. In the present application, the disease modifying antirheumatic drugs can be further divided into the biological disease modifying antirheumatic drugs and the non-biological disease modifying antirheumatic drugs, wherein the non-biological disease modifying antirheumatic drugs include, but are not limited to, the traditional disease modifying antirheumatic drugs and the targeted disease modifying antirheumatic drugs.

In some embodiments, the compound of formula (I) may be administered alone or in combination with one or more additional agents that modulate the immune system of a patient or anti-inflammatory drugs in a pharmaceutically acceptable dosage form. The immunomodulators include, but are not limited to, immunosuppressants. The immunosuppressants include, but are not limited to, biological immunosuppressants such as antilymphocyte serum and antilymphocyte Y globulin; chemosynthetic immunosuppressants such as cyclophosphamide, chlorambucil, busulfan, nitrogen mustard, 6-mercaptopurine, 6-mercaptoguanine, 5-fluorouracil, 8-diazoguanine, cortisone, hydrocortisone, prednisone, chloramphenicol, cyclosporine A, FK-506, actinomycin D, daunorubicin and mitomycin C; and plant-based immunosuppressants such as Tripterygium wilfordii, vincristine and colchicine. The anti-inflammatory drugs include, but are not limited to, non-steroidal anti-inflammatory drugs. These agents may be administered as part of the same or separate dosage forms, via the same or different routes of administration, in accordance with known dosing regimens.

In some embodiments of the present application, the compound of formula I or the pharmaceutically acceptable salt thereof is administered alone as the only active ingredient to the patient with rheumatoid arthritis. In some embodiments, the compound of formula I or the pharmaceutically acceptable salt thereof is administered simultaneously or sequentially with the other disease modifying antirheumatic drugs to a patient with rheumatoid arthritis. In some embodiments, the other disease modifying antirheumatic drugs include, but are not limited to, the traditional disease modifying antirheumatic drugs, the targeted disease modifying antirheumatic drugs, or the biological disease modifying antirheumatic drugs. In some embodiments, the compound of formula I or the pharmaceutically acceptable salt thereof is administered simultaneously or sequentially with the non-biological disease modifying antirheumatic drug to a patient with rheumatoid arthritis.

Unless otherwise stated, the doses and ranges provided herein are based on the molecular weight of the free base form of the compound of formula I.

Unless otherwise stated, for the purposes of the present application, the following terms used herein shall have the following meanings.

"Patient" includes a mammal, and preferably a human.

"Pharmaceutically acceptable" refers to that when a substance is used for preparing a pharmaceutical composition, the pharmaceutical composition is generally safe, non-toxic, and desirable biologically and otherwise, and inclusion of the substance is acceptable for pharmaceutical use in human.

"Pharmaceutically acceptable salt" includes, but is not limited to, acid addition salts of inorganic acids such as hydrochloric acid, hydrobromic acid, sulfuric acid, nitric acid and phosphoric acid, or acid addition salts of organic acids such as acetic acid, trifluoroacetic acid, propionic acid, hexanoic acid, heptanoic acid, cyclopentanepropionic acid, glycolic acid, pyruvic acid, lactic acid, malonic acid, succinic acid, malic acid, maleic acid, fumaric acid, tartaric acid, citric acid, benzoic acid, cinnamic acid, mandelic acid, methanesulfonic acid, ethanesulfonic acid, 1,2-ethanedisulfonic acid, 2-hydroxyethanesulfonic acid, benzenesulfonic acid, p-chlorobenzenesulfonic acid, p-toluenesulfonic acid, 3-phenylpropionic acid, trimethylacetic acid, t-butylacetic acid, dodecyl sulfuric acid, gluconic acid, glutamic acid, hydroxyl naphthoic acid, salicylic acid and stearic acid.

"Therapeutically effective amount" refers to an amount of a compound that, when administered to a human for use in treating a disease, is sufficient to effectively control the disease. In terms of the present application, it will be understood by those skilled in the art that the "therapeutically effective amount" includes a therapeutic dose that ameliorates one or more symptoms associated with rheumatoid arthritis.

In the present application, the treatment includes, but is not limited to, slowing the progression of the disease, and ameliorating the symptoms of the disease.

"Treat" or "treatment" or "treating" refers to any administration of a therapeutically effective amount of a compound, and includes:

(1) suppressing a disease in a human experiencing or exhibiting the pathology or symptomatology of the disease (i.e., preventing further pathological and/or symptomatological progression), or (2) improving the disease in a human experiencing or exhibiting the pathology or symptomatology of the disease (i.e., reversing the pathology and/or symptomatology).

"Targeted treatment" means that the treatment achieves clinical remission, i.e., 28 joint disease activity score (DAS28)≤2.6, or clinical disease activity index (CDAI)≤2.8, or simplified disease activity index (SDAI)≤3.3.

When the above standard cannot be achieved, the low disease activity can be used as the therapeutic target, namely DAS28≤3.2, or CDAI≤10, or SDAI≤11.

"Not meeting the target or not reducing disease activity" refers to not meeting the target of the targeted treatment or failing to reduce the disease activity.

"Systemic" refers to that in addition to arthritis, there are various organs in the body involved.

"Polyarticular" refers to that according to the clinical presentation of the patient at the first 6 months of the disease, there are 5 or more joints involved.

"Oligoarticular" refers to that according to the clinical presentation of the patient at the first 6 months of the disease, there are 4 or less than 4 joints involved.

"Juvenile rheumatoid arthritis" refers to that the age of onset is less than 16 years old.

"Adult rheumatoid arthritis" refers to that the age of onset is greater than or equal to 16 years old.

DETAILED DESCRIPTION

Example 1

Cell Assay

Figure 1:
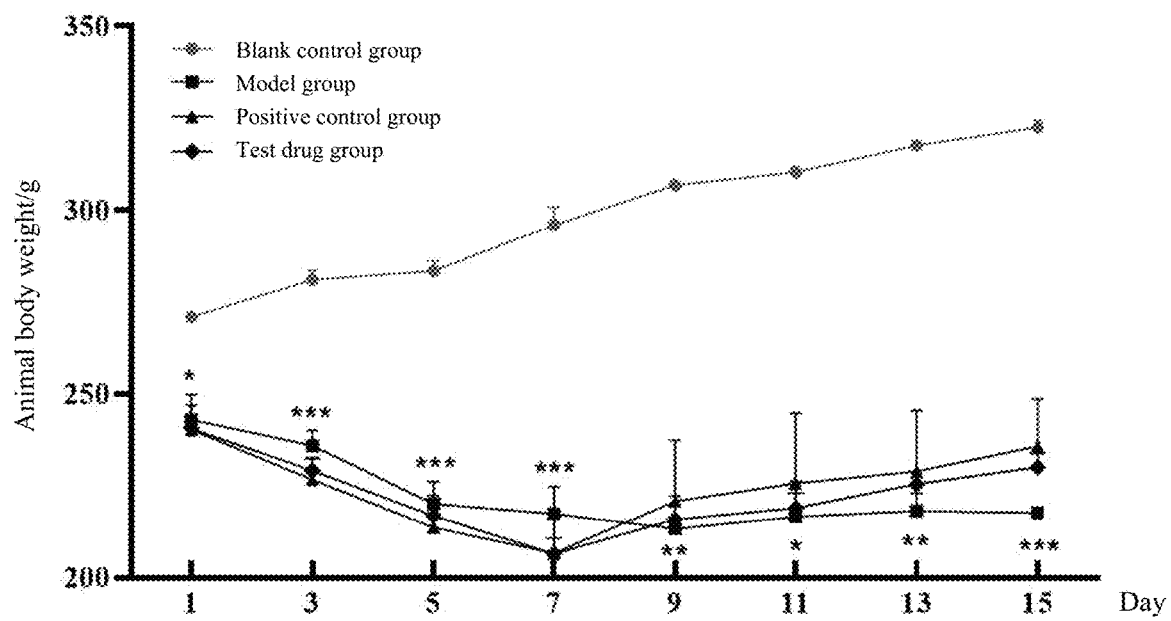
FIG. 1 illustrates the effect of drugs on the weight of the rats.

An MTT assay for the inhibition of human rheumatoid arthritis synovial cells using the dihydrochloride salt of the compound of formula I as the test drug: the trypsinized cell suspension was seeded in a 96-well plate at a volume of 100 μL per well, with $1 \times 10^4$ cells per well. The edges of the plate were wiped with sterile PBS. The plate was placed in a cell incubator and incubated at 37° C. with 5% $CO_2$. After 24 h of incubation, the original culture solution in the wells was aspirated. Then 100 μL of culture solution with gradient concentration of drug was added to each well, and 6 concentrations were set, namely, 0 μM, 0.5 μM, 1 μM, 2 μM, 5 μM and 10 μM, respectively. The plate was placed in the incubator and incubated at 37° C. with 5% $CO_2$. After 24 h and 48 h after dosing, 20 μL of MTS was added to each well. The plate was incubated at 37° C. for 1.5 h. The absorbance of each well at a wavelength of 540 nm was measured by a microplate reader, and the inhibition rate of cells in each group was calculated.

The calculation formula is as follows:

cell inhibition rate/%=(1−OD value of blank control group/OD value of each concentration drug group)×100%

The results showed that compared with the drug-free group at 0 μM, the drug-containing group could significantly inhibit the proliferation of human rheumatoid arthritis synovial cells, and the inhibitory effect was enhanced along with the increase of the concentration of the drug.

Example 2

Animal Experiments
1. Establishment of CIA Model

After adaptive feeding of 80 SPF male SD rats with the weight of 140±10 g for 5 days, 10 male SD rats were randomly selected as a normal control group, and the rest were subjected to collagen-induced arthritis model modeling. The specific methods are as follows.

A solution of the bovine type II collagen (CII) in acetic acid (containing 2.0 mg·mL$^{-1}$ bovine CII) and an equal volume of complete Freund's adjuvant (CFA) were completely mixed, and the mixture was fully emulsified. The emulsion was added dropwise to water without diffusing as the degree, and finally the emulsion containing 1.0 mg·mL$^{-1}$ bovine CII was prepared. 0.2 mL of the emulsion was taken and injected intradermally into the dorsal and the base of the tail at four points (two points on the dorsal and two points on the base of the tail) for the primary immunization (d0). After day 7 (d7) of primary immunization, the emulsion was injected again as described above to boost the immunization. Then the arthritis index (AI) was scored on day 14 (d14). The highest score of each rat was 16 points, and the arthritis induction was considered successful if there was at least 1 paw with AI score≥2.

2. Grouping and Administration

The CIA rats successfully modeled were randomly divided into a drug medium-dose group, a drug low-dose group and a model group, with 10 rats in each group. The normal group and the model group were subjected to intragastric administration with 0.02 mL·g$^{-1}$ normal saline; the drug medium-dose group and the drug low-dose group were administered with the dihydrochloride salt of the compound of formula I at 20 mg/kg and 10 mg/kg, respectively, (the vehicle was normal saline). The positive drug group was subjected to intragastric administration with dexamethasone sodium phosphate with the dose of 0.05 mg/kg. The rats was administered once daily from Monday to Friday (i.e., consecutively five-day administration and then two-day interruption). The dosing period was two weeks.

3. Detection and Results

After day 28 of the experiment, the blood was collected from the abdominal aorta of the rats in each group, and the serum was separated. The tumor necrosis factor-α (TNF-α) and the interleukin-1β (IL-1β) were detected by enzyme-linked immunosorbent assay, and the specific method was carried out according to the specifications of the kit. Statistical analysis was performed using SPSS 20.0 statistical software.

Determination of the rat paw swelling degree: before the primary immunization (d0), every 7 d (d7, d14) after the primary immunization and every 4 d after treatment, the thickness of the right hind paw of the rats was measured with a vernier caliper at the same position. Statistical analysis was performed using SPSS 20.0 statistical software.

After the animal blood collection was finished, ankle joints were fixed in 10% formalin. The ankle joints were subjected to decalcification by 10% acetic acid and then were subjected to routine paraffin embedding, slicing and HE staining. The slices were observed by pathology professionals, and then the damage degree of joint synovial tissue, joint bones and cartilage tissue was observed and scored for comparison.

Observation of lesions and scoring: 1. whether the joint synovial cells are proliferated or eroded (denatured, necrotic), and whether the inflammatory cells infiltrate or not; 2. whether the pannus is formed (composed of blood vessels and fibroblasts); 3. whether the bony erosion (joint bone and cartilage) or hyperplasia exists; 5. whether the joint cavity has stenosis, disappearance and other lesions. The observation indexes were classified into 3 grades according to the severity of the lesions, which were respectively recorded as: 1 point for slight, 2 points for moderate, and 3 points for severe. 0 points means substantially normal. All scores were accumulated to obtain a total score, and the average score (mean±SD) of each animal in each group was calculated, and the higher the score, the more severe the lesion.

The results showed that the joint surface of the rats in the normal group was covered with a thin layer of hyaline cartilage, the cells were neatly arranged without degeneration or necrosis, and the joint cavity was clear. The joint capsule was composed of loose connective tissue, and the surface of the tissue was covered with 1-4 layers of synovial cells. The cells have no degeneration, necrosis and hyperplasia. In the model group, the synovial cells were eroded, and there were different degrees of inflammatory cell infiltration and pannus in the synovial tissue. The bone was eroded, and the joint cavity was stenosed. The lesions in the dexamethasone sodium phosphate group were significantly reduced as compared to those in the model group. The joints of the administration group were improved in different degrees, and were improved in a dose-dependent manner.

In addition, the results also showed that compared with the model group, each group containing the test drugs could reduce the contents of TNF-α and IL-1β in the serum of rats, and the paw swelling degree was significantly reduced. The joint inflammatory infiltration was significantly reduced, the synovium hyperplasia was significantly relieved, and the joint cavity stenosis was significantly improved. It showed that the drug of the present invention can block inflammatory reaction, improve joint function and delay the progress of rheumatoid arthritis, and thus can be used for preparing the anti-rheumatoid arthritis drugs.

Example 3

1. Laboratory Animals

15 SPF healthy male rats from Wistar with the weight of 160-180 g and purchased from Shanghai Institute of Planned Parenthood Research, with Certificate No. 20180006022473 in an SPF feeding environment.

2. Experimental Reagents and Preparation Thereof (2.1) Experimental Reagents
Bovine type II collagen (CII): Chondrex Inc.
Complete Freund's adjuvant (CFA): Chondrex Inc., CFA contains Bacille Calmette-Guerin vaccine (BCG) (BCG=1 mg/mL)

(2.2) Experimental Drugs
Anlotinib hydrochloride (i.e., the dihydrochloride salt of the compound of formula I). Dexamethasone sodium phosphate injection with the specification of 1 mL:5 mg.

(2.3) Preparation of Modeling Agent
Preparation of CII/CFA (BCG=1 mg/mL) emulsion: the vehicle of collagen solution was 0.05 M acetic acid, and the concentration of the collagen was 2 mg/mL The emulsion was prepared by emulsification with CFA (BCG=1 mg/mL) in equal volume ratio in a three-way tube. The emulsification operation was performed on ice for 30 min, and the final concentration of collagen was 1 mg/mL (2.4) Preparation of Drugs
Dexamethasone solution: the commercially available dexamethasone sodium phosphate injection was diluted with normal saline to a concentration of 0.01 mg/mL for later use.

Anlotinib solution: the anlotinib hydrochloride was dissolved with normal saline, and diluted to a concentration of 1 mg/mL for later use.

3. The Specific Experimental Operations Comprise the Followings.

(3.1) Establishment of Rheumatoid Arthritis CIA Model
15 rats were randomly divided into two groups according to the weight, blank control group (n=3) and modeling group (n=12).

Modeling group: on day 1 of the experiment, the primary immunization was performed. The animals in the modeling group were anesthetized with isoflurane. Four points were taken to inject the modeling agent on both sides of the spinal cord skin at the base of the tail of the rats. A total of 0.2 mL of CII/CFA molding emulsion was injected intradermally. On day 8 of the experiment, the second immunization was performed, and the operations were the same as those on day 1 of the experiment. Blank control group: equal volume of normal saline was injected.

After modeling was completed, the animals were normally observed and housed. After the hind limb joints of the animals were diseased, the animals were grouped according to the joint swelling degree and the joint score, wherein the scoring criteria were as follows:

clinical diagnostic scoring criteria for joint soft tissue swelling and joint mobility:

| Scoring | Clinical symptoms |
|---|---|
| 0 | normal |
| 1 | slight, but significant redness and swelling or near redness and swelling of the ankle joints or knee joints, spread to the tips of the fingers (no matter how many) |
| 2 | severe redness and swelling of the ankle joints or knee joints |
| 3 | severe redness and swelling of the entire soles of foot, including the tips of fingers |
| 4 | cannot bear a weight |

(3.2) Animal Grouping and Administration

Animals in the blank control group (n=3) were all entered Group-1 and administered with normal saline by intragastric administration.

The animals in the modeling group were divided into 3 groups according to the joint swelling degree and the joint scores: group-2 (n=4, model group), group-3 (n=4, positive control group), and group-4 (n=4, test drug group).

After grouping, oral gavage administration was started according to the grouping requirements, and the administration volume was 10 mL/kg. The administration was carried out once daily for 14 days (from day 1 to day 14). On day 15, the animals were dissected after collection of relevant experimental data. Specific types and modes of administration are shown in the following table:

| Group | Number of animals | Administration regimen | |
|---|---|---|---|
| Group-1 | 3 | Blank control group | Administration of normal saline |
| Group-2 | 4 | Model group | Administration of normal saline |
| Group-3 | 4 | Positive control group | Administration of dexamethasone solution (0.1 mg/kg) |
| Group-4 | 4 | Test drug group | Administration of anlotinib solution (10 mg/kg) |

(3.3) Monitoring Items

1) Weight Monitoring

During the experiment, the weight of the rats in each group was measured once daily from the day of grouping and administration (day 1) to day 15.

2) Hind Limb Joint Size Monitoring

During the experiment, the width and thickness of the hind limb ankle joints of the rats in each group were measured with a vernier caliper on day 1, day 4, day 8, day 11 and day 15.

3) Hind Limb Joint Lesion Scoring

During the experiment, hind limb ankle joints of the rats in each group were scored for joint soft tissue swelling and joint mobility on day 1, day 4, day 8, day 11 and day 15.

4) Hind Limb Joint Weight Determination

On day 8, two rats in each group were dissected, and the weight of the hind limb joints was measured. The remaining animals were subjected to normal experiments according to the grouping schedule. On day 15, the remaining animals in each group were dissected, and the weight of the hind limb joints was measured.

5) Joints Photographing

One rat in each group was selected, and the hind limb ankle joints thereof were photographed on day 4, day 8, day 11 and day 15.

4. Experimental Results

1) Effect of Drugs on the Weight of Rats

FIG. 1 shows the change (mean±sem) in the weight of the rats in each group over time during the experiment (note: model group vs. blank control group *$P<0.05$, $P<0.01$, *$P<0.001$). As shown in FIG. 1, after the onset of arthritis, the rats began to lose weight due to the immobility and loss of appetite caused by pain. In the positive control group, the rats had significant weight loss at the early stage, which was caused by the side effect of the hormone drug dexamethasone. After treatment with the drugs, the weight of the rats in the positive control group and the test drug group began to regain from day 7.

2) Effect of Drugs on the Size of Hind Limb Joints of Rats

Figure 2:
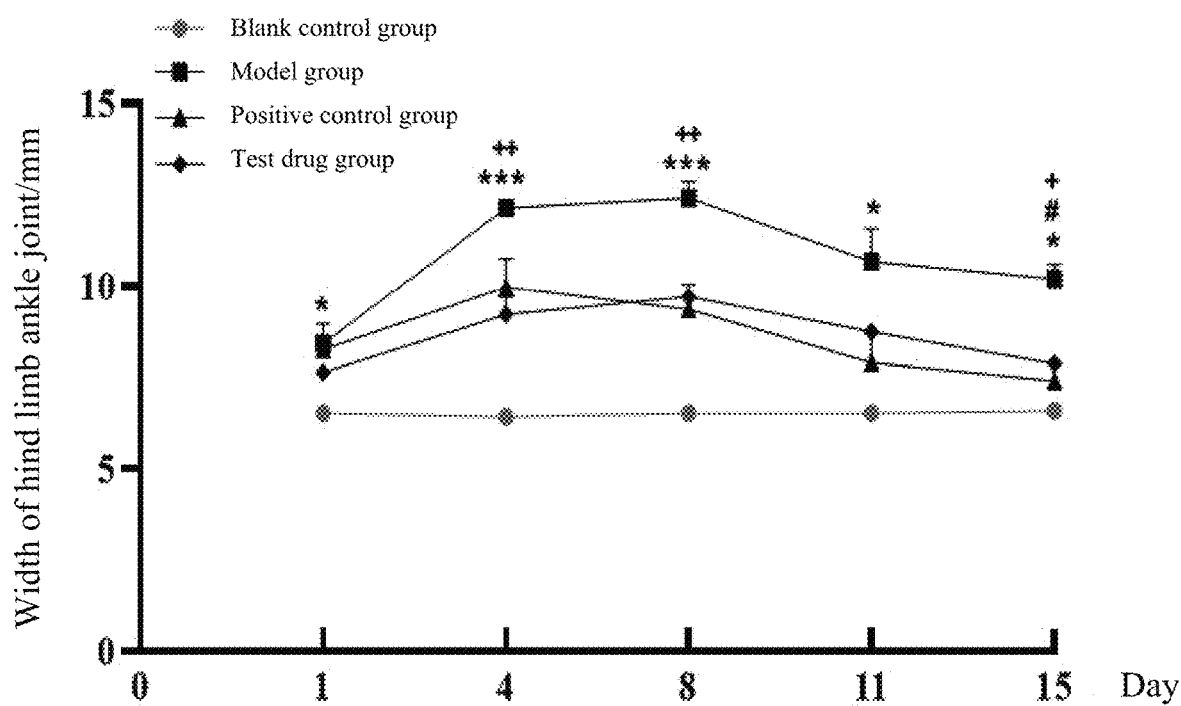
FIG. 2 illustrates the effect of the drugs on the width of the hind limb ankle joints of the rats.
Figure 3:
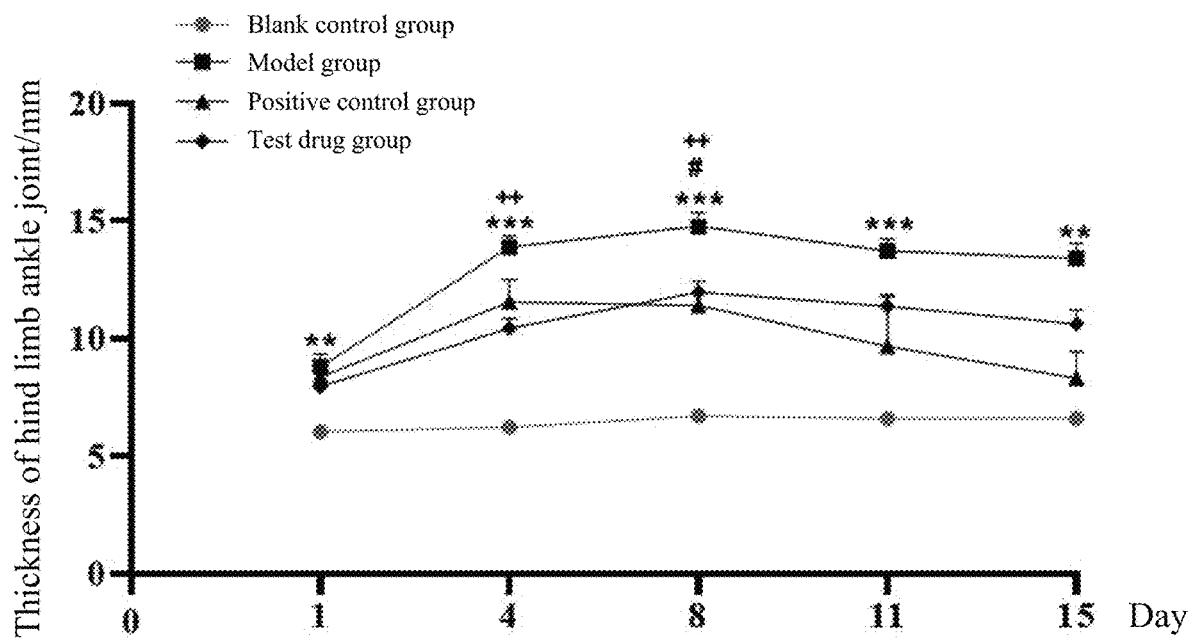
FIG. 3 illustrates the effect of the drugs on the thickness of the hind limb ankle joints of the rats.

FIG. 2 shows the change (mean±sem) in the width of the hind limb ankle joints of the rats in each group over time during the experiment (note: model group vs. blank control group *$P<0.05$, *$P<0.001$; positive control group vs. model group #$P<0.05$; test drug group vs. model group +$P<0.05$, +$P<0.01$). FIG. 3 shows the change (mean±sem) in the thickness of the hind limb ankle joints of the rats in each group over time during the experiment (note: model group vs. blank control group $P<0.01$, ***$P<0.001$; positive control group vs. model group #$P<0.05$; test drug group vs. model group ++$P<0.01$).

As shown in FIGS. 2 and 3, after treatment with the positive control drug, the width of the ankle joints of the rats in the positive control group was lower than that of the model group on day 15 ($P<0.05$), and the thickness of the ankle joints of the rats in the positive control group was lower than that of the model group on day 8 ($P<0.05$); after the treatment with the test drug, the width of the hind limb ankle joints of the rats in the test drug group was lower than that of the model group on day 4 ($P<0.01$), day 8 ($P<0.01$) and day 15 ($P<0.05$), and the thickness of the hind limb ankle joints of the rats in the test drug group was lower than that of the model group on day 4 and day 8 ($P<0.01$). It can be seen that the joint swelling degree of the positive control group and the test drug group has been improved to a certain extent as compared to that of the model group.

3) Effect of Drugs on the Lesion Scores of Hind Limb Joints of Rats

Figure 4:
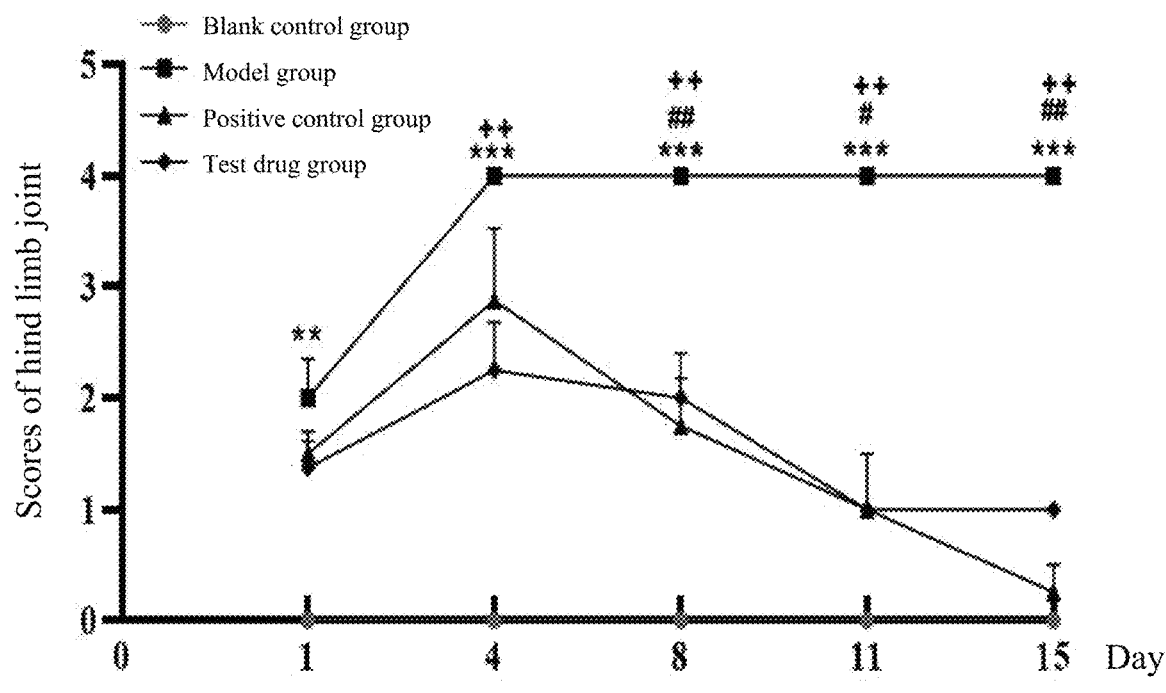
FIG. 4 illustrates the effect of the drugs on the scores of the hind limb joints of the rats.

FIG. 4 shows the change (mean±sem) in the lesion scores of the hind limb joints of the rats in each group over time during the experiment (note: model group vs. blank control group $P<0.01$, *$P<0.001$; positive control group vs. model group #$P<0.05$, ##$P<0.01$; test drug group vs. model group +$P<0.05$, ++$P<0.01$). As shown in FIG. 4, the scores of the hind limb ankle joints of the animals in the model group were increased as compared to those of the blank control group on day 4, day 8, day 11 and day 15, and the scores of the model group were significantly different as compared to the blank control group ($P<0.001$). The scores of the ankle joints in the positive control group were lower than those of the model group on day 8 ($P<0.01$), day 11 ($P<0.05$) and day 15 ($P<0.05$). The scores of the hind limb ankle joints in the test drug group were lower than those of the model group on day 4 ($P<0.01$), day 8 ($P<0.01$), day 11 ($P<0.01$) and day 15 ($P<0.01$).

4) Effect of Drugs on the Weight of Hind Limb Joints of Rats

Figure 5:
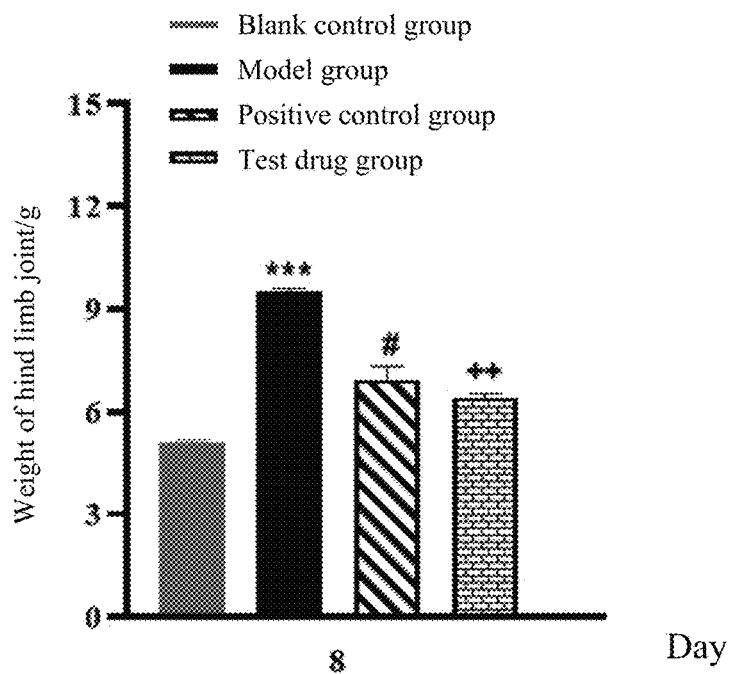
FIG. 5 illustrates the effect of the drugs on the weight of the hind limb joints of the rats.

FIG. 5 shows the weight (mean±sem) of the hind limb joints of the rats in each group on day 8 (note: model group vs. blank control group ***$P<0.001$; positive control group vs. model group #$P<0.05$; test drug group vs. model group ++$P<0.01$). As shown in FIG. 5, the weight of the hind limb joints of the rats in the positive control group was lower than that of the model group on day 8 (P<0.05), and the weight of the hind limb joints of the rats in the test drug group was also lower than that of the model group on day 8 (P<0.01).

5) Effect of Drugs on the Size of Hind Limb Joints of Rats

Figure 6:
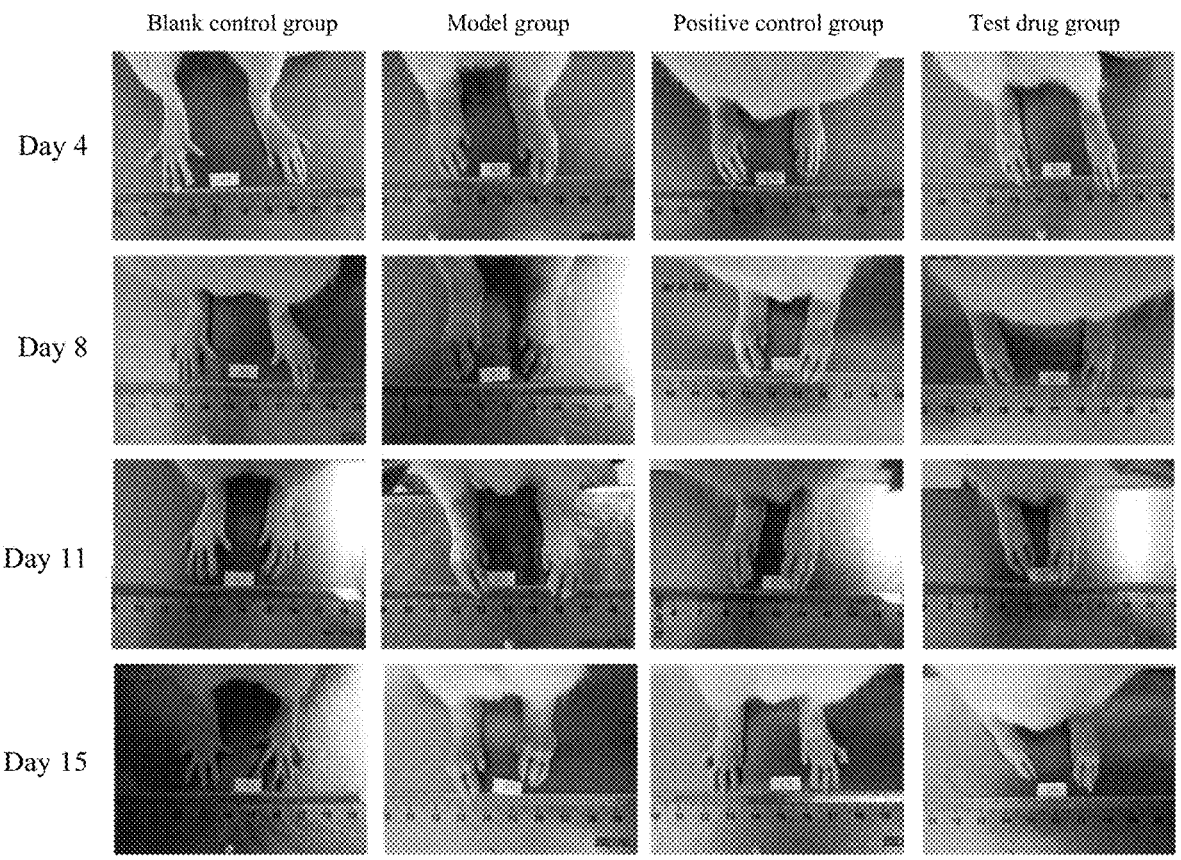
FIG. 6 illustrates front photographs of swelling of hind limb joints of the animals in each group.
Figure 7:
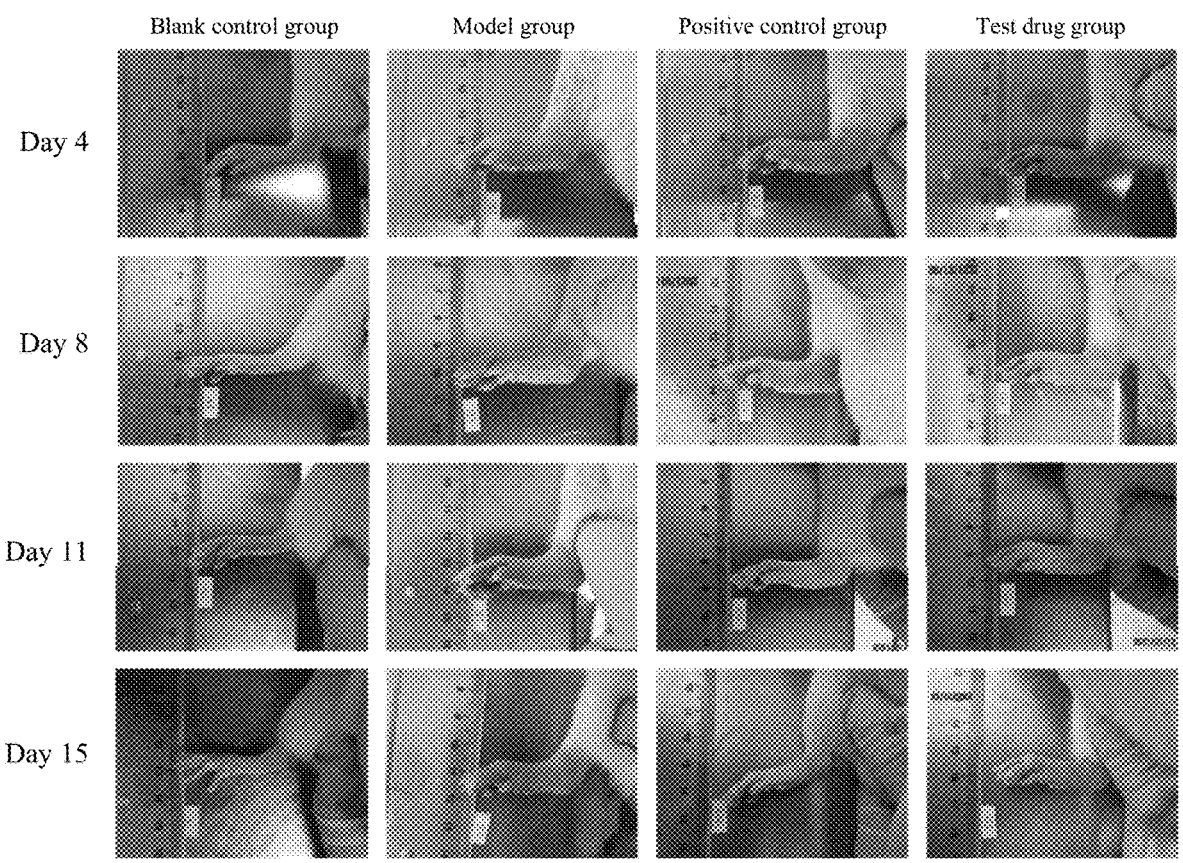
FIG. 7 illustrates side view photographs of swelling of hind limb joints of the animals in each group.

As shown in FIGS. 6 and 7, during the experiment, the hind limb joints in the model group were significantly red and swollen, and the joint swelling degree of the positive control group and the test drug group was improved to a certain extent as compared to that of the model group.

In conclusion, the test drug showed significant drug efficacy on the rat rheumatoid arthritis model. It can improve joint function and delay the progress of rheumatoid arthritis.

The invention claimed is:

1. A method for treating rheumatoid arthritis in a patient, comprising administering to the patient in need of treatment a therapeutically effective amount of a compound of formula I or a pharmaceutically acceptable salt thereof formula I

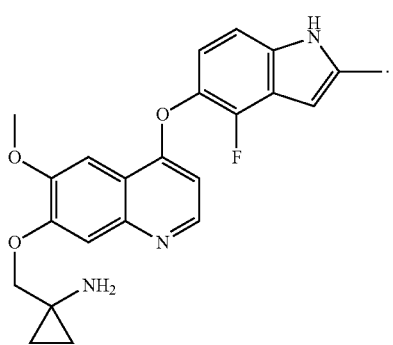

2. The method according to claim 1, wherein the patient has previously received treatment with a disease modifying antirheumatic drug.

3. The method according to claim 1, wherein the patient is insufficiently responsive or intolerant to at least one disease modifying antirheumatic drug.

4. The method according to claim 1, wherein the patient does not meet target or does not reduce disease activity after having previously received treatment with a traditional disease modifying antirheumatic drug, a targeted disease modifying antirheumatic drug and/or a biological disease modifying antirheumatic drug.

5. The method according to claim 1, wherein the compound of formula I or the pharmaceutically acceptable salt thereof is administered as the only active ingredient to a patient.

6. The method according to claim 1, further comprising administering other disease modifying antirheumatic drugs, wherein the compound of formula I or the pharmaceutically acceptable salt thereof is administered simultaneously or sequentially with the other disease modifying antirheumatic drugs to a patient with rheumatoid arthritis.

7. The method according to claim 6, wherein the other disease modifying antirheumatic drugs are selected from the group consisting of non-biological disease modifying antirheumatic drugs.

8. The method according to claim 6, wherein the other disease modifying antirheumatic drugs are selected from the group consisting of one or more of traditional disease modifying antirheumatic drugs, targeted disease modifying antirheumatic drugs and biological disease modifying antirheumatic drugs.

9. The method according to claim 6, wherein the other disease modifying antirheumatic drugs are selected from the group consisting of methotrexate.

10. The method according to claim 6, wherein the other disease modifying antirheumatic drugs are selected from the group consisting of: methotrexate+sulfasalazine; methotrexate+leflunomide; methotrexate+hydroxychloroquine; sulfasalazine+leflunomide; methotrexate+sulfasalazine+hydroxychloroquine; sulfasalazine+leflunomide+hydroxychloroquine; leflunomide+hydroxychloroquine; sulfasalazine+leflunomide+hydroxychloroquine; and tofacitinib and one or more selected from the group consisting of: methotrexate, sulfasalazine, leflunomide and hydroxychloroquine.

11. The method according to claim 1, wherein the pharmaceutically acceptable salt is a salt formed by the compound of formula I and any of the following acids: hydrochloric acid, hydrobromic acid, sulfuric acid, nitric acid, phosphoric acid, acetic acid, trifluoroacetic acid, propionic acid, hexanoic acid, heptanoic acid, cyclopentanepropionic acid, glycolic acid, pyruvic acid, lactic acid, malonic acid, succinic acid, malic acid, maleic acid, fumaric acid, tartaric acid, citric acid, benzoic acid, cinnamic acid, mandelic acid, methanesulfonic acid, ethanesulfonic acid, 1,2-ethanedisulfonic acid, 2-hydroxyethanesulfonic acid, benzenesulfonic acid, p-chlorobenzenesulfonic acid, p-toluenesulfonic acid, 3-phenylpropionic acid, trimethylacetic acid, t-butylacetic acid, dodecyl sulfuric acid, gluconic acid, glutamic acid, hydroxyl naphthoic acid, salicylic acid and stearic acid; or the pharmaceutically acceptable salt is a hydrochloride salt; or the pharmaceutically acceptable salt is a dihydrochloride salt.

12. The method according to claim 1, wherein the rheumatoid arthritis is active rheumatoid arthritis.

13. The method according to claim 1, wherein the rheumatoid arthritis is moderate-to-severe, moderate and/or severe active rheumatoid arthritis.

* * * * *